(12) United States Patent
Bird

(10) Patent No.: US 6,481,472 B1
(45) Date of Patent: Nov. 19, 2002

(54) HOLD DOWN AND GUARD

(76) Inventor: Lonnie Bird, 1859 Mud Creek Rd., Gallipolis, OH (US) 45631

( * ) Notice: Subject to any disclaimer, the term of this patent is extended or adjusted under 35 U.S.C. 154(b) by 0 days.

(21) Appl. No.: 09/880,614

(22) Filed: Jun. 13, 2001

(51) Int. Cl.[7] .............................................. B27G 21/00
(52) U.S. Cl. .............................. 144/251.2; 144/253.2; 144/135.2; 409/134; 409/219
(58) Field of Search ........................... 144/251.1, 251.2, 144/253.1, 253.2, 253.5, 135.2; 409/134, 219; 408/67, 241.6

(56) References Cited

U.S. PATENT DOCUMENTS

| 321,728 | A | * | 7/1885 | Jamieson | |
|---|---|---|---|---|---|
| 727,536 | A | * | 5/1903 | Forster | 144/251.2 |
| 883,148 | A | * | 3/1908 | Sanders | 144/251.2 |
| 1,183,566 | A | * | 5/1916 | Jessrang | 144/251.2 |
| 1,286,329 | A | * | 12/1918 | Hube | 144/251.2 |
| 4,842,031 | A | * | 6/1989 | Peek | 144/251.2 |

OTHER PUBLICATIONS

Box Fence, Published Date Prior to Jun. 13, 2001.

* cited by examiner

*Primary Examiner*—W. Donald Bray
(74) *Attorney, Agent, or Firm*—Crompton, Seagerr & Tufte LLC

(57) ABSTRACT

A guard for use with a woodworking machine having a worktable and a cutting tool for performing operations on a workpiece is disclosed. A guard in accordance with the present invention comprises a guard member having a body portion, a workpiece engaging portion, and a machine engaging portion. The workpiece engaging portion of the guard member includes a workpiece engaging surface. The workpiece engaging surface is preferably configured such that the body portion of the guard member is deflected when the workpiece is urged against the workpiece engaging surface in a direction substantially parallel to a working surface of the worktable for engagement with the cutting tool.

25 Claims, 7 Drawing Sheets

HOLD DOWN AND GUARD

FIELD OF THE INVENTION

The present invention relates generally to machines and tools for cutting and shaping wood. More particularly, the present invention relates to hold down and guarding devices for use in conjunction with machines and tools for cutting and shaping wood.

BACKGROUND OF THE INVENTION

Many woodworking methods such as routing, joining and cutting involve the step of moving a workpiece past a rotating cutting tool. These operations are typically performed on a woodworking machine having a worktable. Examples of such machines include router tables, shapers, joiners, jointers, and table saws. Examples of rotating cutting tools include saw blades and router bits. When performing a woodworking operation on a table such as routing, joining and cutting the machine operator must control the path of the workpiece as it moves relative to the cutting tool. The motion of the workpiece is typically guided in whole or in part by hand.

Various safety devices may be utilized to minimize the inherent dangers of woodworking. For example, a safety device may seek to reduce the likelihood that a woodworkers hand will contact the cutting tool. By way of a second example, a safety device may seek to reduce the likelihood that a workpiece will thrown at the woodworker. One example of a situation in which a workpiece is thrown at a woodworker is an occurrence known in the art as kickback.

One type of kickback occurs when the workpiece binds to a cutting tool, for example the blade of a table saw. As a workpiece is cut on a table saw, the blade removes material from the workpiece creating an elongate kerf through the workpiece. Residual stresses within the workpiece sometimes cause the material of the workpiece to close around the blade. A portion of the workpiece may bind to the blade, causing the workpiece to be carried along with the blade as it rotates at high speed. When kickback occurs, the workpiece may be thrown upwardly and rearwardly toward the body of the saw operator. The workpiece may strike the unfortunate operator causing bodily injury.

One example of a safety device that is used frequently by woodworkers is a feather board. A feather board typically includes a plurality of fingers or pawls. The pawls are typically biased so that they ride over a surface of the workpiece as it is fed in a forward direction past the cutting tool. When a kickback situation arises while a feather board is being used, the workpiece begins movement in a reverse direction causing a corresponding rotation of the pawls. As the pawls rotate, they may jam the workpiece against a fence mounted on the table of the machine, thereby preventing any further reverse movement. In addition, when a raised panel is formed on a router, for example, the router may undercut the wood beneath the feather board. The feather board can then apply downward force on the wood which is unsupported below the feather board. This can result in the workpiece tipping out of plane toward the feather board.

SUMMARY OF THE INVENTION

The present invention relates generally to machines and tools for cutting and shaping wood, which overcomes many of the limitations of the prior art. More particularly, the present invention relates to hold down and guarding devices for use in conjunction with machines and tools for cutting and shaping wood. A guard for use with a woodworking machine having a worktable and a cutting tool for performing operations on a workpiece is disclosed. A guard in accordance with the present invention features a guard member having a body portion, a workpiece engaging portion, and a machine engaging portion. The workpiece engaging portion of the guard member includes a workpiece engaging surface. The workpiece engaging surface is preferably configured such that the body portion of the guard member is deflected when the workpiece is urged against the workpiece engaging surface in a direction substantially parallel to a working surface of the worktable for engagement with the cutting tool.

In certain implementations of the invention, the workpiece engaging surface of the workpiece engaging portion of the guard member features a rounded surface defining a tangent line disposed at an angle relative to the working surface of the worktable. In an advantageous embodiment, the angle between the tangent line and the working surface is an acute angle.

In other implementations of the invention, the workpiece engaging surface of the workpiece engaging portion of the guard member features a surface defining a plane disposed at an angle relative to the working surface of the worktable. In an advantageous embodiment, the angle between the plane and the working surface is an acute angle.

In an advantageous embodiment of the present invention, the workpiece engaging portion of the guard member comprises a low friction material. In a particularly advantageous embodiment of the present invention, the workpiece engaging portion of the guard member comprises ultra high molecular weight polyethylene.

In one aspect of the present invention, the body portion of the guard member is configured such that the workpiece engaging portion of the guard member exerts a force on the workpiece in the direction of the worktable when the body portion of the guard member is deflected.

In an advantageous embodiment of the present, the body portion of the guard member comprises an arcuate wall. In a particularly advantageous embodiment the body portion of the guard member comprises an arcuate wall having an undeflected shape having a first radius, and a deflected shape having a second radius, wherein the second radius is generally greater than the first radius.

In an advantageous embodiment of the present invention, the body portion of the guard member comprises a resilient material. Examples of resilient materials that may be suitable in some applications include polycarbonate and acrylic.

In an additional aspect of the present invention, the body portion of the guard member may comprise a substantially optically transparent material. Examples of optically transparent materials that may be suitable in some applications include polycarbonate and acrylic.

In yet another aspect of the present invention, the machine engaging portion of the guard member includes means for releasably fixing the guard member to the wood working machine. In certain implementations of the invention, the machine engaging portion of the guard member includes means for releasably fixing the guard member to a fence of the wood working machine. For example, the machine engaging portion of the guard member defines a plurality of slots.

DETAILED DESCRIPTION OF THE INVENTION

The following detailed description should be read with reference to the drawings, in which like elements in different drawings are numbered in like fashion. The drawings which are not necessarily to scale, depict selected embodiments and are not intended to limit the scope of the invention. In some cases, the drawings may be highly diagrammatic in nature. Examples of constructions, materials, dimensions, and manufacturing processes are provided for various elements. Those skilled in the art will recognize that many of the examples provided have suitable alternatives which may be utilized.

Figure 1:
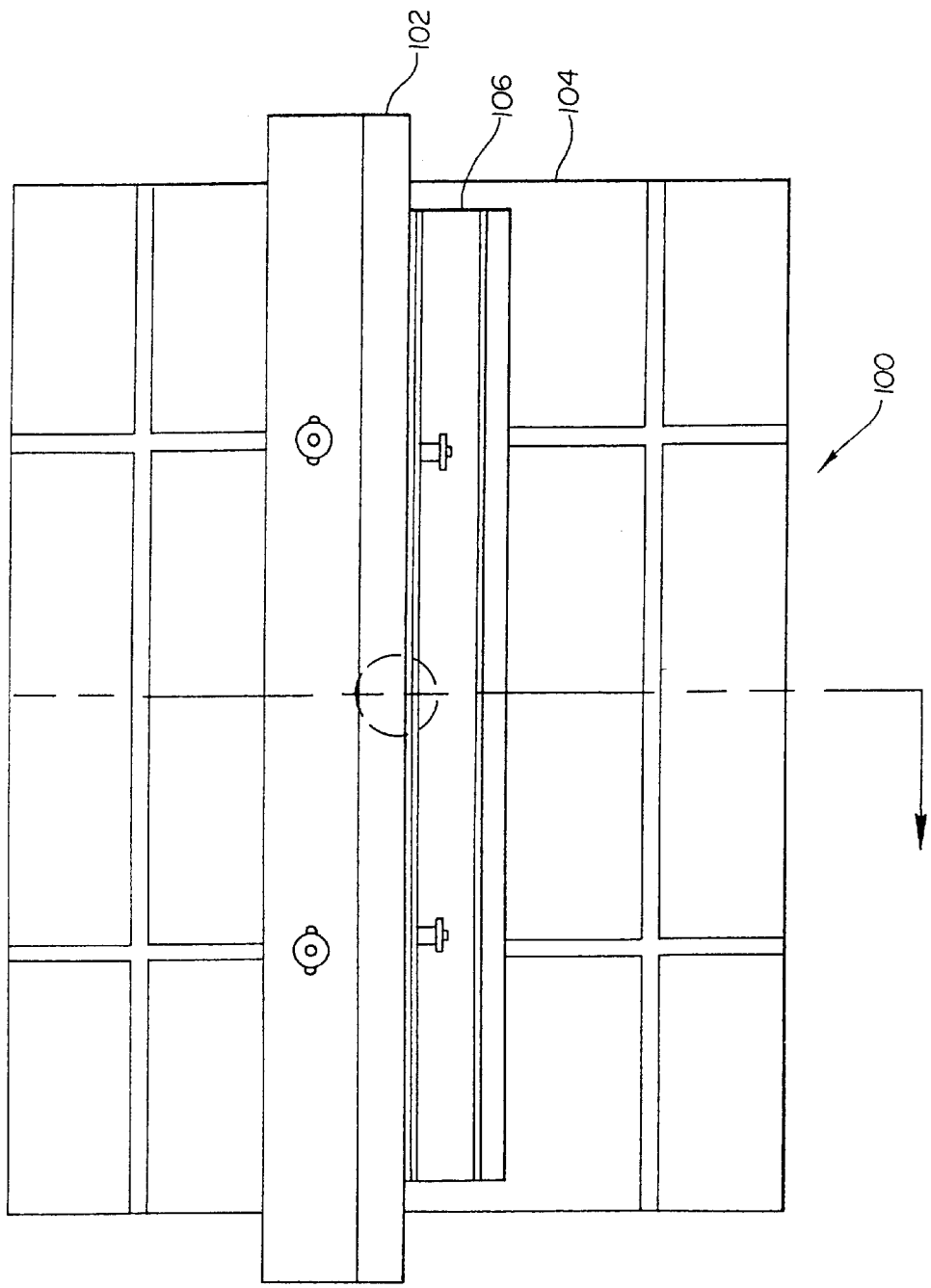
FIG. 1 is a plan view of a woodworking machine having a worktable, a fence that is fixed to the worktable, and a guard in accordance with an exemplary embodiment of the present invention fixed to the fence.

FIG. 1 is a plan view of a woodworking machine 100 having a worktable 104 and a fence 102 that is fixed to worktable 104. In the embodiment of FIG. 1, woodworking machine 100 comprises a router table. It is to be appreciated that the present invention may be used with other woodworking machines without deviating from the spirit and scope of the present invention. Examples of other woodworking machines include table saws, routertables, jointers, joiners, surface planers, band saws, drill presses, and oscillating spindle sanders. In the embodiment of FIG. 1, a guard 106 in accordance with an exemplary embodiment of the present invention is fixed to fence 102 of woodworking machine 100.

Figure 2:
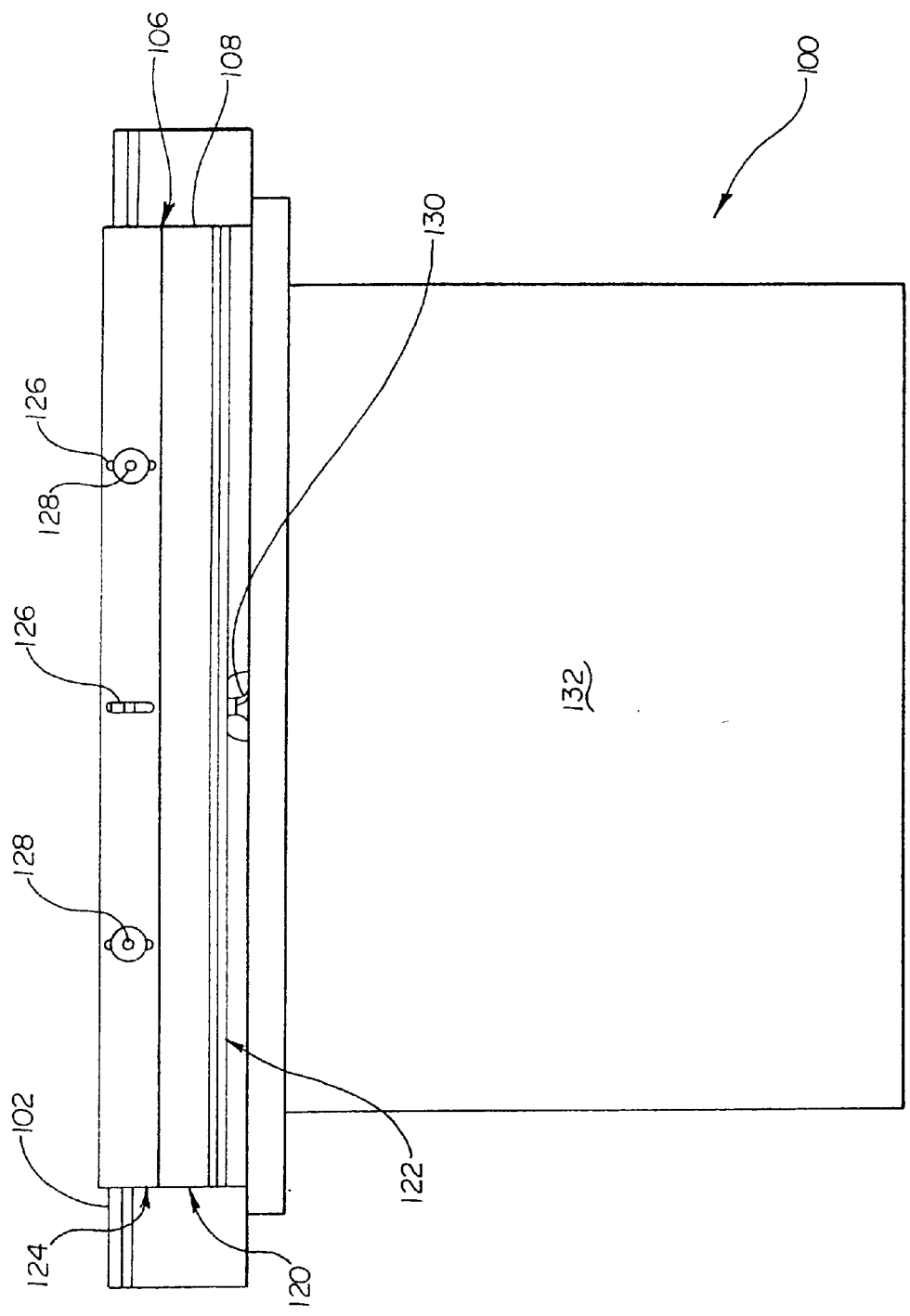
FIG. 2 is an additional plan view of the woodworking machine and the guard of FIG. 1.

FIG. 2 is an additional plan view of woodworking machine 100 of FIG. 1. In FIG. 2 it may be appreciated that guard 106 comprises a guard member 108 having a body portion 120, a workpiece engaging portion 122, and a machine engaging portion 124. Machine engaging portion 124 of guard member 108 is preferably adapted for releasably fixing guard member 108 to woodworking machine 100. In the embodiment of FIG. 2, machine engaging portion 124 of guard member 108 defines a plurality of slots 126. Also in the embodiment of FIG. 2, guard 106 is fixed to fence 102 with a plurality of fasteners 128 that pass through slots 126. A base 132 and a cutting tool 130 of woodworking machine 100 are also visible in FIG. 2.

Figure 3:
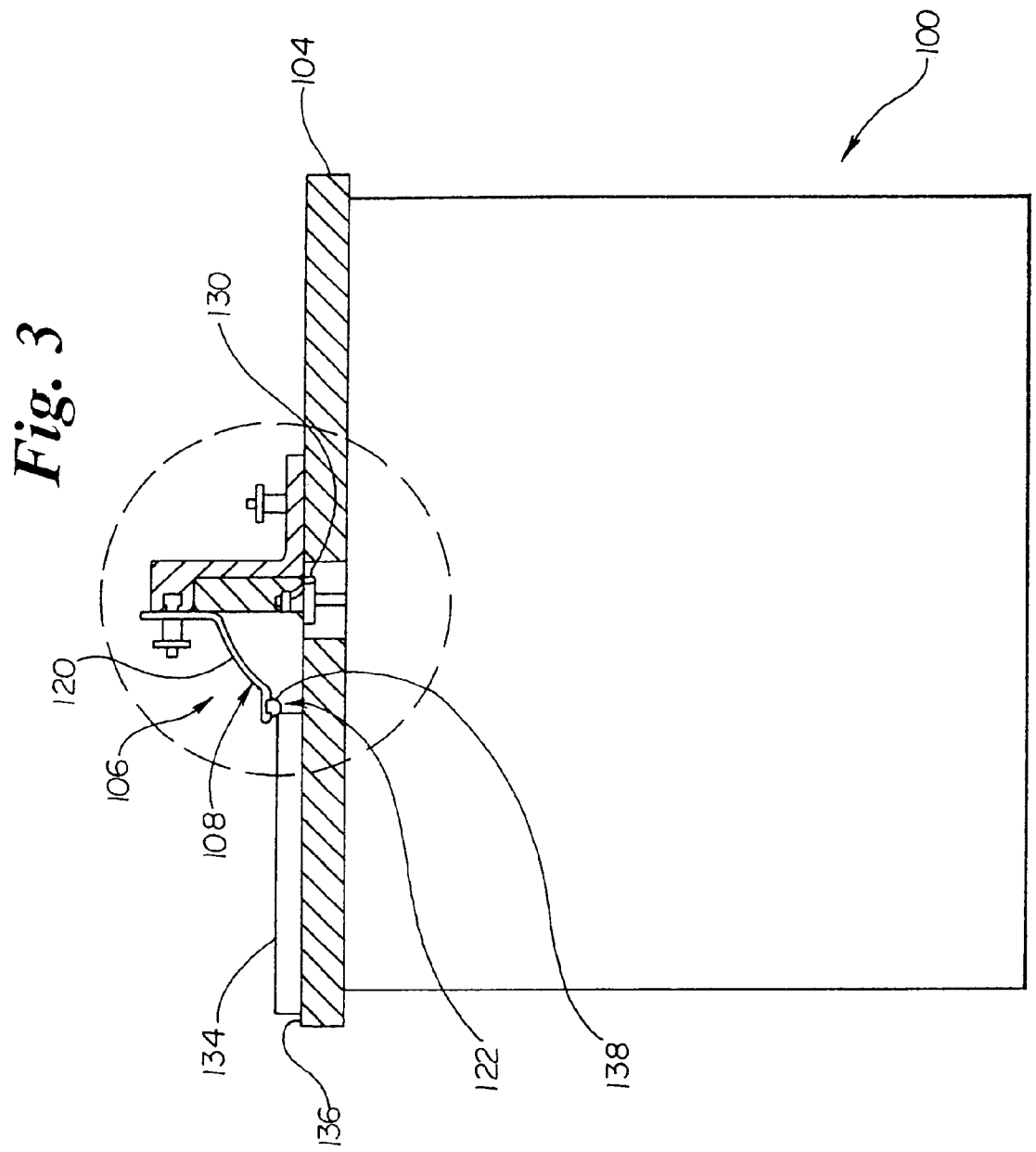
FIG. 3 is a cross sectional view of the woodworking machine and the guard of FIG. 1 and FIG. 2, taken along section line A—A shown in FIG. 1.

FIG. 3 is a cross sectional view of woodworking machine 100 and guard 106 taken along section line A—A shown in FIG. 1. In FIG. 3, a workpiece 134 is shown resting on a working surface 136 of worktable 104 proximate workpiece engaging portion 122 of guard member 108. In FIG. 3, it may be appreciated that workpiece engaging portion 122 of guard member 108 includes a workpiece engaging surface 138. Workpiece engaging surface 138 is preferably configured such that body portion 120 of guard member 108 is deflected when workpiece 134 is urged against workpiece engaging surface 138 in a direction substantially parallel to working surface 136 of worktable 104 for engaging cutting tool 130.

Figure 4:
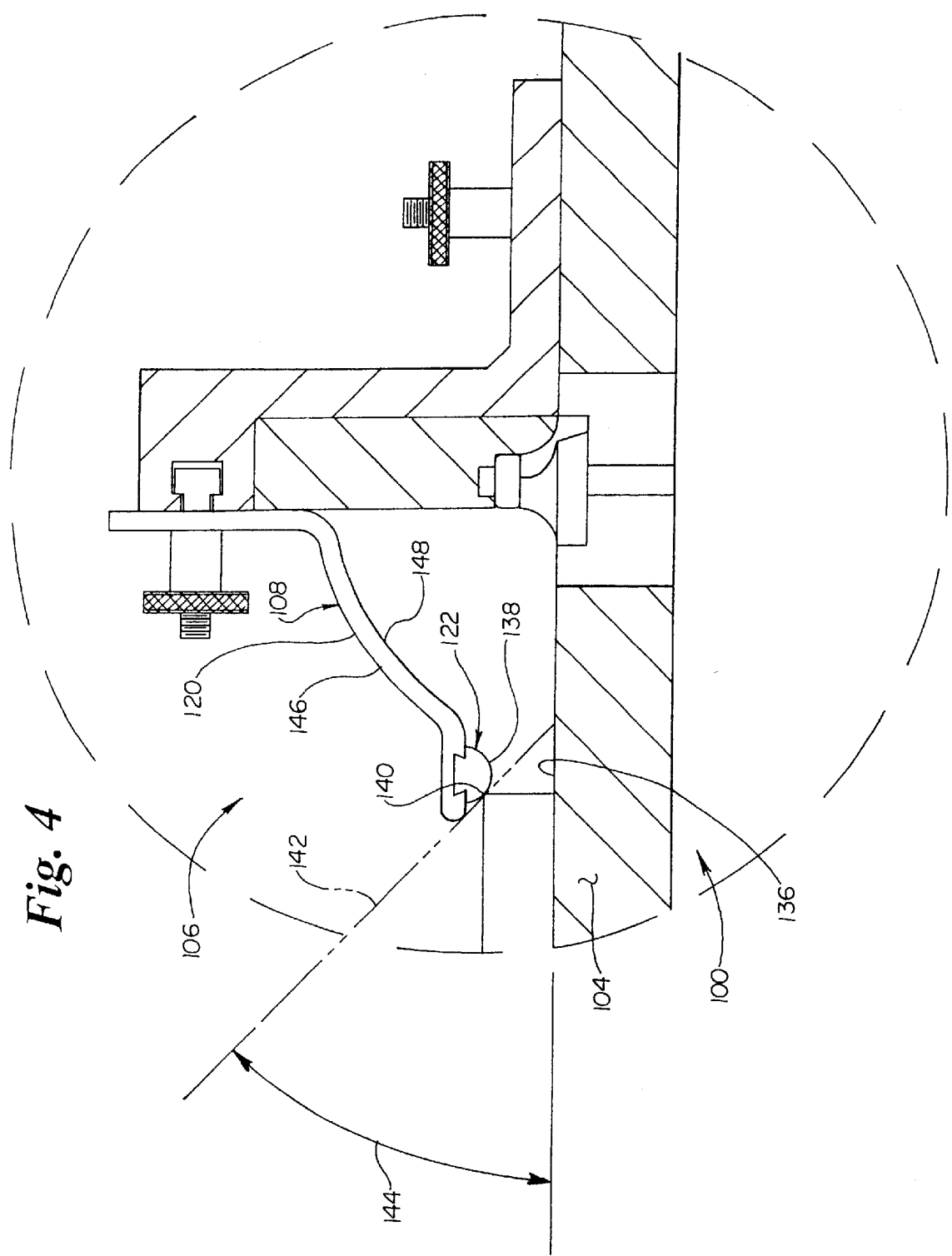
FIG. 4 is an enlarged cross sectional view of a portion of the woodworking machine and the guard of FIG. 3.

FIG. 4 is an enlarged cross sectional view of a portion of woodworking machine 100 and guard 106 of FIG. 3. In the embodiment of FIG. 4, workpiece engaging surface 138 of workpiece engaging portion 122 of guard member 108 comprises a rounded surface 140 defining a tangent line 142 disposed at an angle 144 relative to working surface 136 of worktable 104. In a preferred embodiment, angle 144 between tangent line 142 and working surface 136 is an acute angle. Embodiments of guard 106 are possible in which rounded surface 140 comprises a cylindrical surface.

In the embodiment FIG. 4, body portion 120 of guard member 108 includes an arcuate wall 146. In a preferred embodiment body portion 120 of guard member 108 comprises a resilient material. Examples of resilient materials that may be suitable in some applications include polycarbonate and acrylic. In a particularly preferred embodiment, body portion 120 of guard member 108 has an undeflected shape having a first radius 148, and a deflected shape having a second radius.

Figure 5:
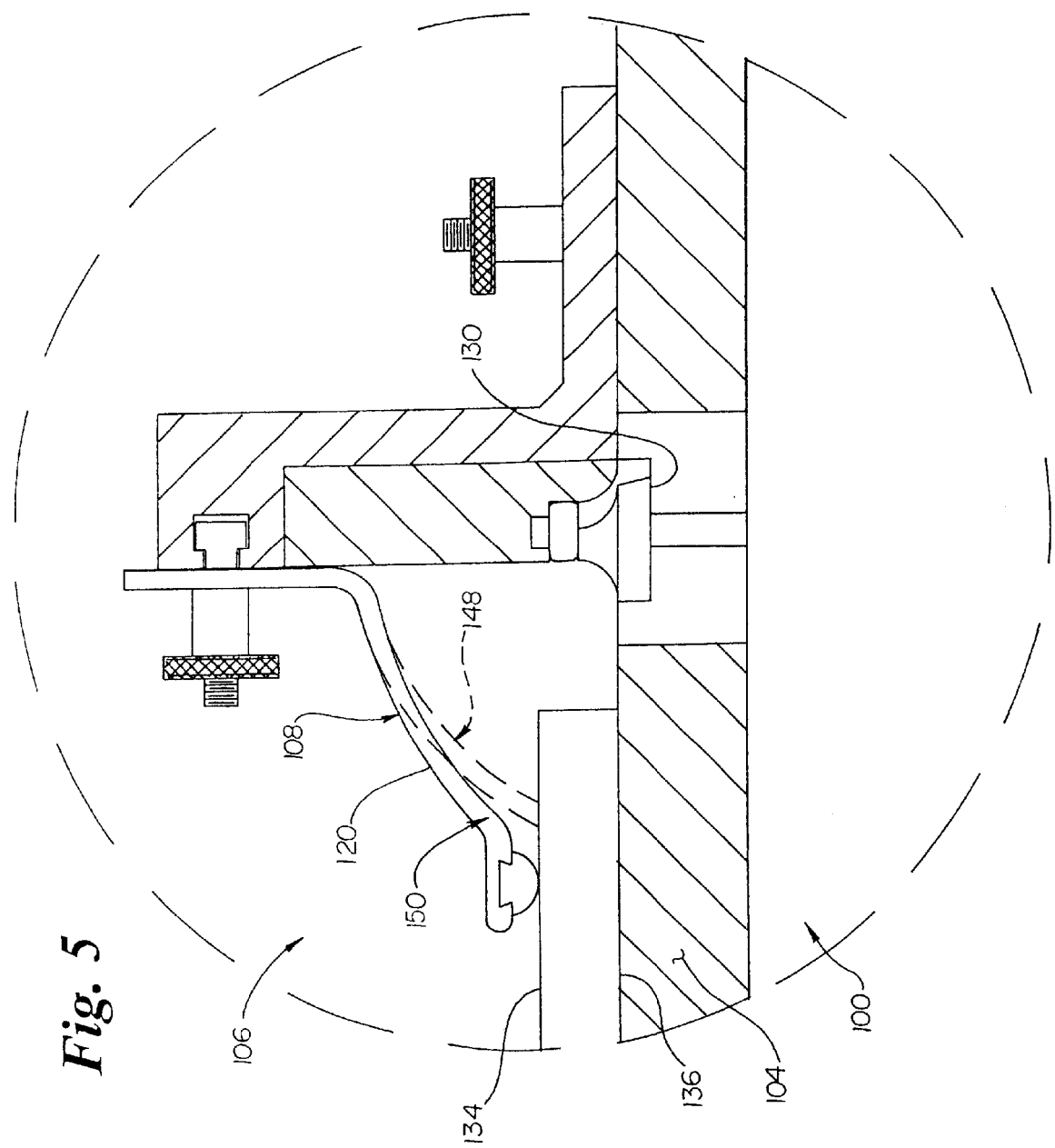
FIG. 5 is an additional enlarged cross sectional view of the portion of the woodworking machine and the guard shown in FIG. 4.

FIG. 5 is an additional enlarged cross sectional view of a portion of woodworking machine 100 and guard 106 of FIG. 3 and FIG. 4. In the embodiment of FIG. 5, workpiece 134 has been moved in a direction substantially parallel to working surface 136 of worktable 104 and toward cutting tool 130. Also in the embodiment of FIG. 5, body portion 120 of guard member 108 has been deflected from an undeflected shape having a first radius 148, to a deflected shape having a second radius 150. For purposes of illustration, the undeflected shape of body portion 120 of guard member 108 and first radius 148 are represented by dashed lines in FIG. 5. In FIG. 5 it may be appreciated second radius 150 is generally greater than first radius 148. Body portion 120 of guard member 108 is preferably configured such that workpiece engaging portion 122 of guard member 108 exerts a force on workpiece 134 in the direction of worktable 104 when body portion 120 of guard member 108 is deflected. It is to be appreciated that various deflections of body portion 120 of guard member 108 are possible without deviating from the spirit and scope of the present invention.

In a preferred embodiment of the present invention, workpiece engaging portion 122 of guard member 108 comprises a low friction material. In a particularly preferred embodiment of the present invention, workpiece engaging portion 122 of guard member 108 comprises ultra high molecular weight polyethylene (UHMWPE). In an additional preferred embodiment of the present invention, body portion 120 of guard member 108 comprises a substantially optically transparent material. Examples of optically transparent materials that may be suitable in some applications include polycarbonate and acrylic.

Figure 6:
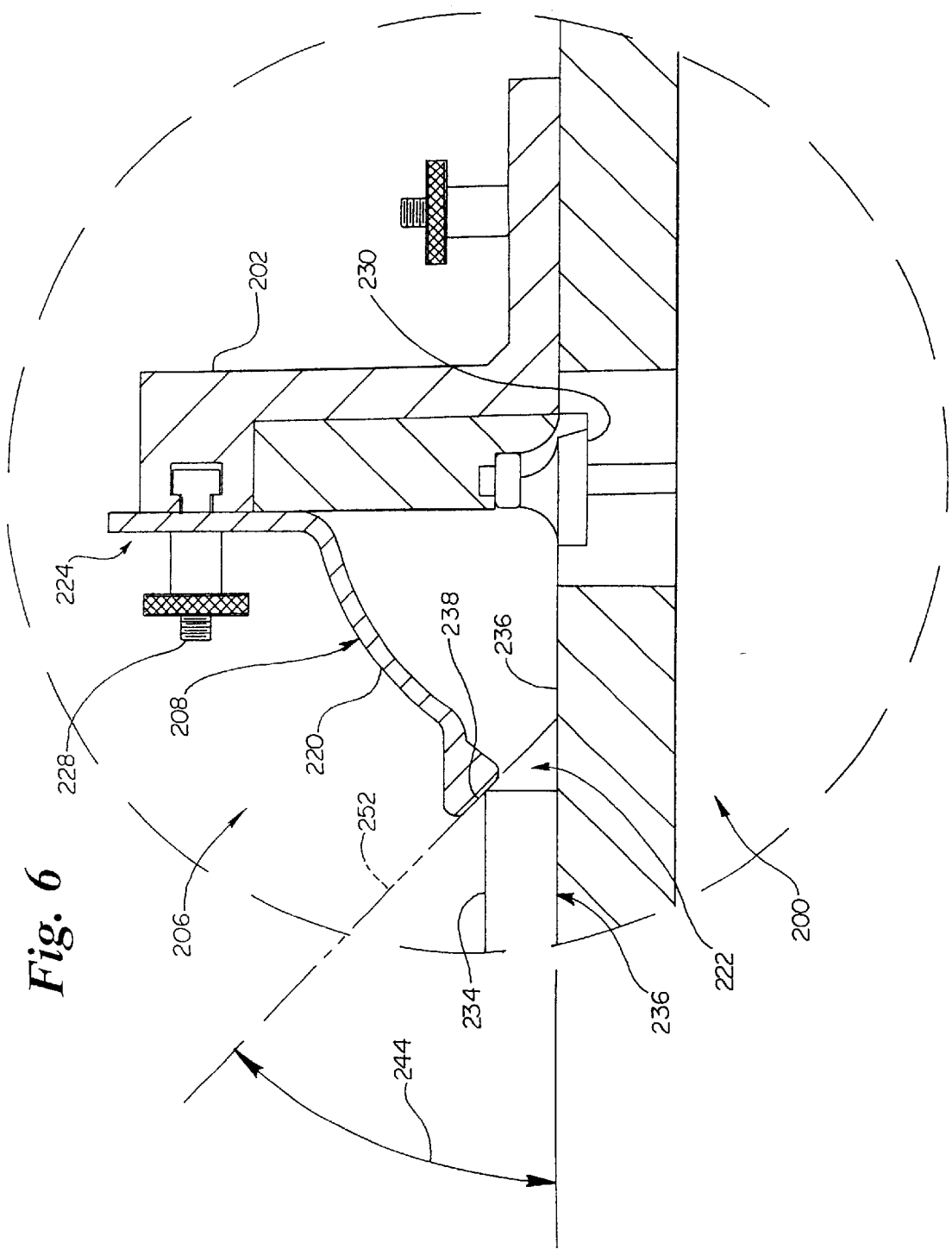
FIG. 6 is a cross sectional view including a guard in accordance with an additional exemplary embodiment of the present invention.

FIG. 6 is a cross sectional view including a guard 206 in accordance with an additional exemplary embodiment of the present invention. Guard 206 comprises a guard member 208 having a body portion 220, a workpiece engaging portion 222, and a machine engaging portion 224. In the embodiment of FIG. 6, body portion 220, workpiece engaging portion 222, and machine engaging portion 224 all preferably comprise the same material. Machine engaging portion 224 of guard member 208 is fixed to a fence 202 of a woodworking machine 200 with a plurality of fasteners 228.

In the embodiment of FIG. 6, workpiece engaging portion 222 includes a workpiece engaging surface 238 that defines a plane 252 disposed at an angle 244 relative to a working surface 236 of a worktable 204 of woodworking machine 200. In a preferred embodiment, angle 244 between plane 252 and working surface 236 is an acute angle.

In FIG. 6, a workpiece 234 is pictured resting on working surface 236 proximate workpiece engaging portion 222 of guard member 208. Workpiece engaging surface 238 is preferably configured such that body portion 220 of guard member 208 is deflected when workpiece 234 is urged against workpiece engaging surface 238 in a direction substantially parallel to working surface 236 of worktable 204 for engaging cutting tool 230.

Figure 7:
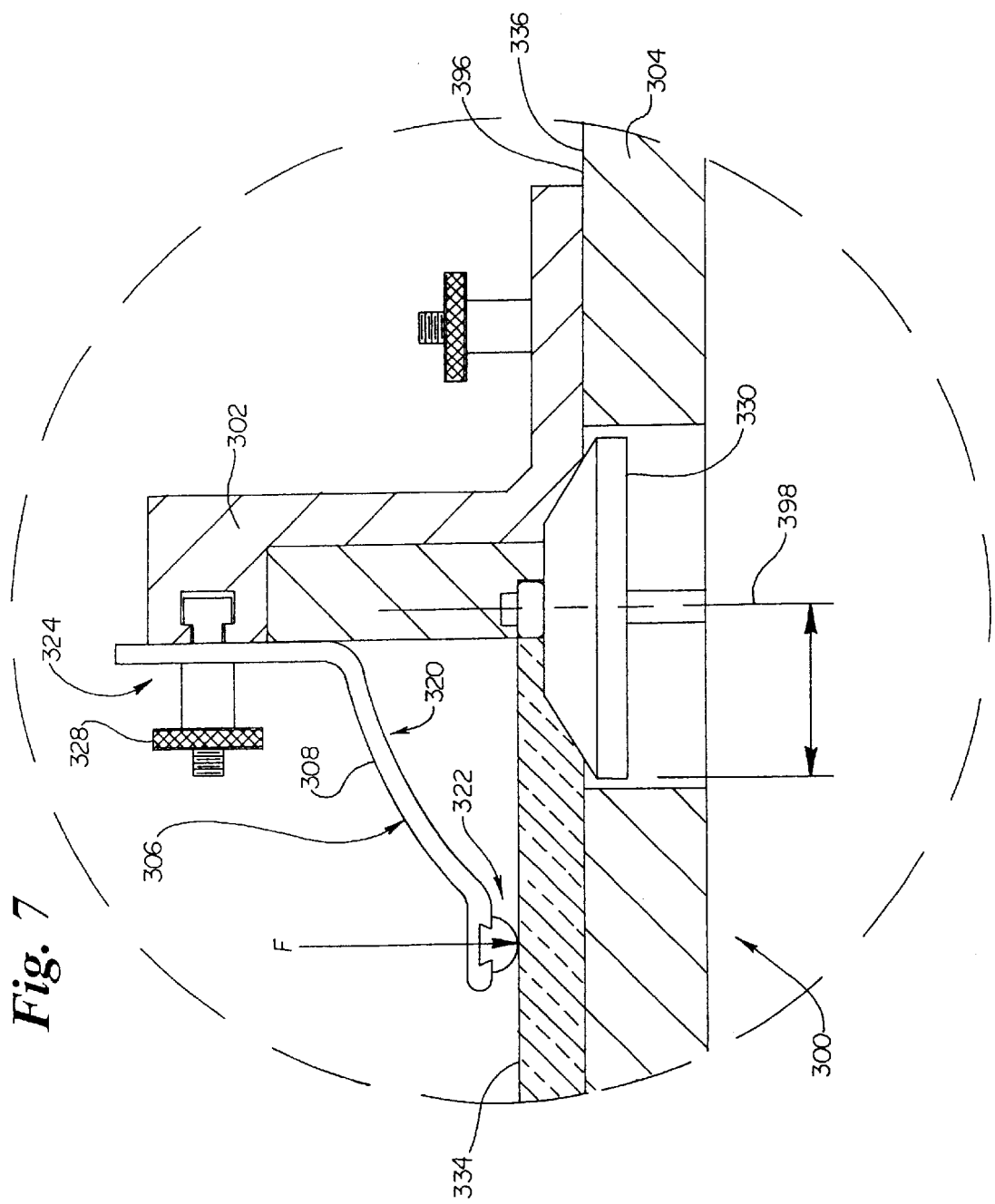
FIG. 7 is a cross sectional view of a portion of a woodworking machine and a guard in accordance with an exemplary embodiment of the present invention.

FIG. 7 is a cross sectional view of a portion of a woodworking machine 300 and a guard 306. In the embodiment of FIG. 7, a workpiece 334 is disposed upon a working surface 336 of a worktable 304 of woodworking machine 300. Workpiece 334 is positioned so that it is engaging a cutting tool 330.

In the embodiment of FIG. 7 it may be appreciated that guard 306 comprises a guard member 308 having a body portion 320, a workpiece engaging portion 322, and a machine engaging portion 324. Machine engaging portion 324 of guard member 308 is preferably adapted for releasably fixing guard member 308 to woodworking machine 300. In the embodiment of FIG. 7, guard 306 is fixed to a fence 302 of woodworking machine 300 with a plurality of fasteners 328 that pass through slots defined by machine engaging portion 324 of guard member 308.

A cutting tool 330 of woodworking machine 300 is also visible in FIG. 7. In a preferred embodiment, cutting tool 330 rotates about a cutting tool axis 398 and working surface 336 defines a horizontal plane 396. In FIG. 7, workpiece engaging portion 322 of guard member 308 is shown applying a force F to workpiece 334.

In a preferred embodiment, the force applied to workpiece 334 by workpiece engaging portion 322 of guard member 308 has a direction that is generally parallel to cutting tool axis 398. Also in a preferred embodiment, the force applied to workpiece 334 by workpiece engaging portion 322 of guard member 308 has a direction that is generally perpendicular to horizontal plane 396.

In a preferred embodiment, the location at which workpiece engaging portion 322 of guard member 308 applies force to workpiece 334 is horizontally displaced relative to cutting tool axis 398. In a particularly preferred embodiment, the location at which workpiece engaging portion 322 of guard member 308 applies force to workpiece 334 is horizontally displaced relative to cutting tool axis 398 by a distance that is greater than a radius 394 of cutting tool 330.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A guard for use with a woodworking machine having a worktable and a cutting tool for performing operations on a workpiece, comprising:

a guard member having a body portion, a workpiece engaging portion, and a machine engaging portion;

the workpiece engaging portion of the guard member including a workpiece engaging surface;

wherein the workpiece engaging surface is configured such that the body portion of the guard member is deflected when the workpiece is urged against the workpiece engaging surface in a direction substantially parallel to a working surface of the worktable for engagement with the cutting tool; and wherein the body portion of the guard member includes an arcuate wall; the arcuate wall having an undeflected shape having a first radius, and a deflected shape having a second radius; and wherein the second radius is generally greater than the first radius.

2. The guard of claim 1, wherein the workpiece engaging surface comprises a rounded surface defining a tangent line disposed at an angle relative to the working surface of the worktable.

3. The guard of claim 2, wherein the angle is an acute angle.

4. The guard of claim 1, wherein the workpiece engaging surface comprises a surface defining a plane disposed at an angle relative to the working surface of the worktable.

5. The guard of claim 4, wherein the angle is an acute angle.

6. The guard of claim 1, wherein the workpiece engaging portion of the guard member comprises a low friction material.

7. The guard of claim 1, wherein the workpiece engaging portion of the guard member comprises a polyethylene material.

8. The guard of claim 1, wherein the workpiece engaging portion of the guard member comprises ultra high molecular weight polyethylene.

9. The guard of claim 1, wherein the body portion of the guard member is configured such that the workpiece engaging portion of the guard member exerts a force on the workpiece in the direction of the worktable when the body portion of the guard member is deflected.

10. The guard of claim 1, wherein the body portion of the guard member comprises an arcuate wall.

11. The guard of claim 1, wherein the body portion of the guard member comprises a resilient material.

12. The guard of claim 1, wherein the body portion of the guard member comprises aluminum.

13. The guard of claim 1, wherein the body portion of the guard member comprises a substantially optically transparent material.

14. The guard of claim 1, wherein the body portion of the guard member comprises polycarbonate.

15. The guard of claim 1, wherein the body portion of the guard member comprises acrylic.

16. The guard of claim 1, wherein the machine engaging portion of the guard member includes means for releasably fixing the guard member to the wood working machine.

17. The guard of claim 1, wherein the machine engaging portion of the guard member includes means for releasably fixing the guard member to a fence of the wood working machine.

18. The guard of claim 1, wherein the machine engaging portion of the guard member defines a plurality of slots.

19. A guard for use with a woodworking machine having a worktable and a cutting tool for performing operations on a workpiece, comprising:

a guard member having a resilient body portion, a workpiece engaging portion, and a machine engaging portion;

the machine engaging portion is connectable to a portion of the woodworking machine such that when the guard member and the machine are connected, the guard member is disposed over at least a portion of the cutting tool;

the workpiece engaging portion of the guard member including a workpiece engaging surface; and wherein the guard member is configured such that the workpiece engaging portion of the guard member applies a force to the workpiece by resilient deformation of the body portion when the workpiece is engaged with the workpiece engaging portion.

20. The guard of claim 19, wherein the force has a direction that is substantially parallel to an axis of the cutting tool.

21. The guard of claim 19, wherein the force has a direction that is substantially perpendicular to a working surface of the worktable.

22. The guard of claim 19, wherein the guard member is configured such that the workpiece engaging portion of the guard member applies the force to the workpiece at a location that is horizontally displaced relative to an axis of the cutting tool.

23. The guard of claim 19, wherein the guard member is configured such that the workpiece engaging portion of the guard member applies the force to the workpiece at a location that is horizontally displaced relative to an axis of the cutting tool by a distance that is greater than a radius of the cutting tool.

24. A guard for use with a woodworking machine, comprising:

a woodworking machine including a worktable and a cutting tool;

a fence releasable attached to the worktable and being positioned adjacent the cutting tool;

a guard member releasably attached to the fence and extending between the fence and the worktable, the guard member having a resilient body portion, a workpiece engaging portion, and a machine engaging portion;

wherein at least a portion of the guard member is disposed over the cutting tool;

the workpiece engaging portion of the guard member including a workpiece engaging surface; and wherein the workpiece engaging surface is configured such that the resilient body portion of the guard member is resiliently deformed when the workpiece is urged against the workpiece engaging surface in a direction substantially parallel to a working surface of the worktable for engagement with the cutting tool.

25. The guard of claim 24, wherein at least a portion of the guard member is curved.

* * * * *